March 8, 1960

S. PUCCINELLI 2,927,615

PNEUMATIC PEELING ARM

Filed May 16, 1956

INVENTOR
SYLVIO PUCCINELLI

BY Hans G. Hoffmeister.
ATTORNEY

March 8, 1960 S. PUCCINELLI 2,927,615
PNEUMATIC PEELING ARM

Filed May 16, 1956 7 Sheets-Sheet 7

INVENTOR
SYLVIO PUCCINELLI
BY Hans G. Hoffmeister
ATTORNEY

United States Patent Office 2,927,615
Patented Mar. 8, 1960

2,927,615

PNEUMATIC PEELING ARM

Sylvio Puccinelli, San Jose, Calif., assignor to Food Machinery and Chemical Corporation, San Jose, Calif., a corporation of Delaware Application May 16, 1956, Serial No. 585,191

6 Claims. (Cl. 146—43)

This invention appertains to machinery for processing fruit and more particularly relates to an improved machine for peeling fruit, such as pears and the like.

In one commercial method of peeling pears, each pear is impaled along its axis on a substantially horizontal spindle and moved in a straight line path under a series of consecutive cutting blades. Each blade contacts the stem end of the pear, moves along the length of the pear, and down over the butt end. Since the butt end of the pear is inclined rather steeply, it is difficult to keep the cutter in contact with the surface as it moves over the butt end. It is, therefore, an object of the present invention to provide an improved mechanism for maintaining the cutting blade of a straight line pear peeler in contact with the surface of the pear as it travels over the entire length of the pear.

Another object is to provide a pear support mechanism capable of adequately supporting the pear during each peeling stroke of the blades and arranged to temporarily release the pear in the interval between successive peeling strokes to permit the pear to be indexed about its axis to an unpeeled surface to the next cutting blade.

Other and further objects and advantages of the present invention will become apparent from the following description taken in connection with the accompanying drawings:

Figs. 8, 9 and 10 are vertical sections, similar to Fig. 7, with parts broken away, and showing the mechanism in different operating positions.

Fig. 11 is a vertical section taken along lines 11—11 of Fig. 10.

Figure 1:
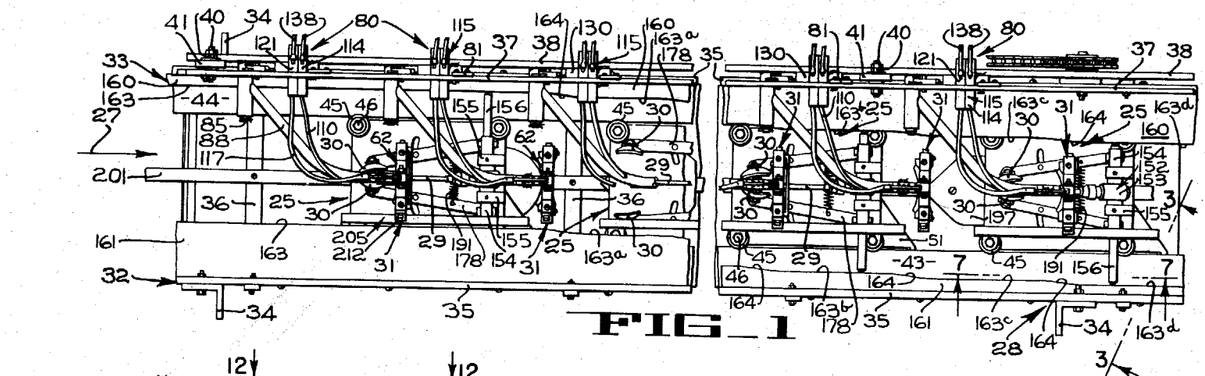
Fig. 1 is a fragmentary plan of a pear peeling machine constructed in accordance with the teaching of the present invention.
Figure 2:
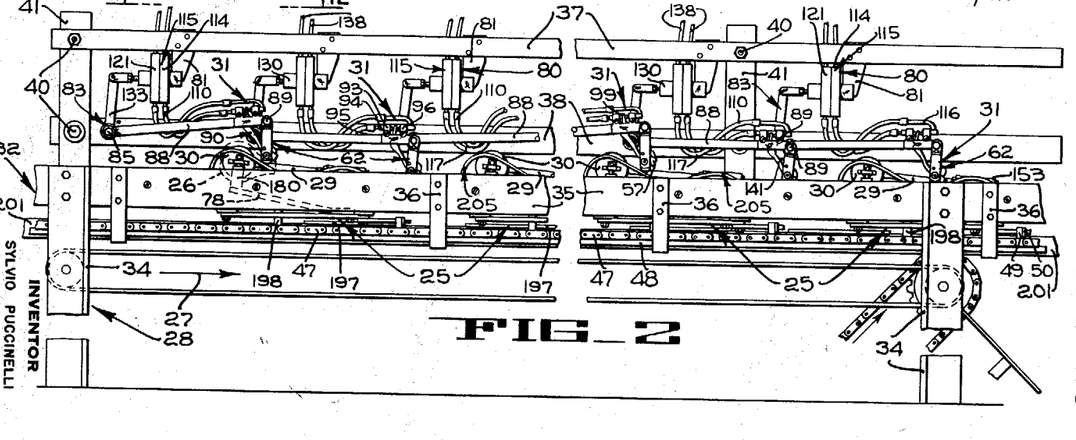
Fig. 2 is a fragmentary side elevation of the machine of Fig. 1.
Figure 3:
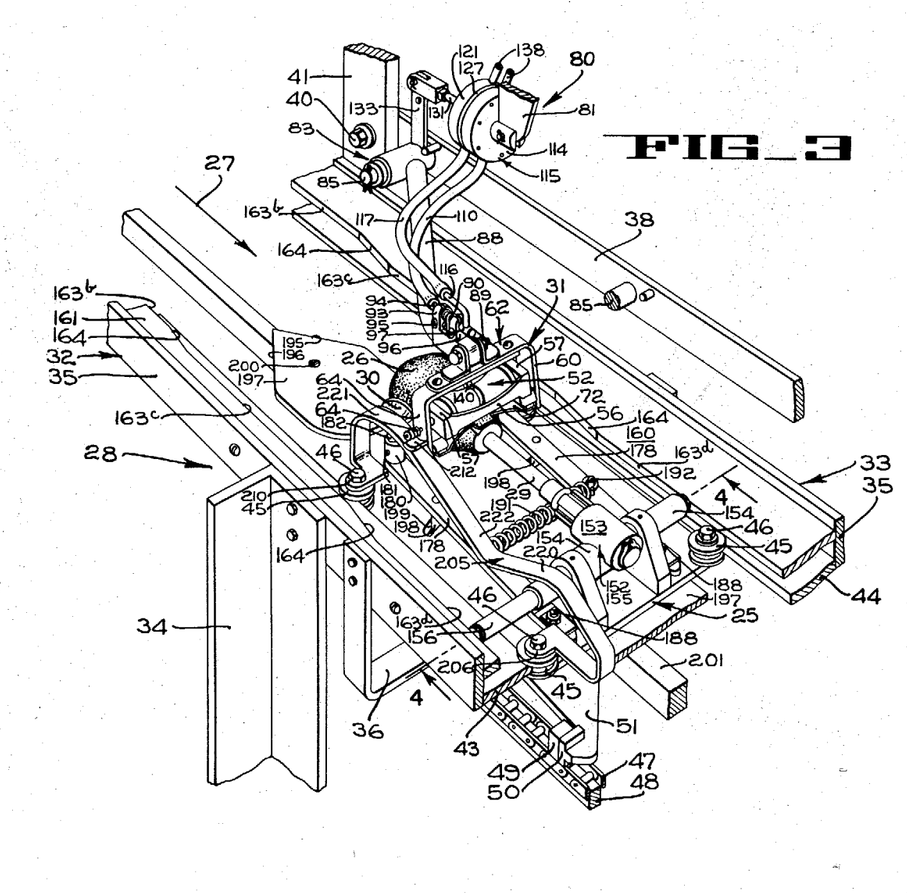
Fig. 3 is an enlarged fragmentary perspective of a portion of the machine of Fig. 1 taken looking in direction of arrows 3—3 of Fig. 1.

In Figs. 2 and 3 the reference numeral 25 indicates a carriage on which a fruit 26, such as a pear, is transported in the direction indicated by the arrow 27 along a support structure 28, with the stem-blossom axis of the pear disposed in a substantially horizontal plane. The pear is impaled on a support rod, or tube 29, and is supported by a pair of laterally spaced, oppositely disposed clamping cups 30 (Fig. 1) which are pivotally mounted on the carriage 25 in a manner to be described presently. As the pear is carried along the structure 28, it passes under a plurality of consecutive cutter assemblies 31 (Fig. 3) each of which contacts the pear at its stem end and slices a longitudinal strip of peel from the surface of the pear, the strip extending from the stem end to the blossom or butt end of the pear. In order that the blade of each successive cutter assembly 31 will contact an unpeeled portion of the pear, the support tube 29 is indexed angularly about its axis immediately after the pear passes each cutter assembly. It will be understood that a sufficient number of cutter assemblies 31 are provided so that the cuts will overlap and the skin will be removed from the entire surface of each pear during one complete angular indexing of the pear.

The support structure 28 comprises a pair of spaced longitudinally extending side frame members 32 and 33 (Fig. 1), each side frame consisting of a plurality of upright posts 34, at the upper ends of which is secured a longitudinally extending rigid bar 35. The side frame members 32 and 33 are secured together in mutual bracing relation by transverse straps 36. Two elongated support bars 37 and 38 are positioned in an elevated position on the far side of the support structure as seen in Fig. 2. These bars, which are secured by bolts 40 to vertical posts 41 projecting upwardly from the frame structure 33, extend longitudinally of the machine along only one side of the structure and provide a support for a cutter control mechanism which will be described hereinafter.

To provide tracks for the carriage 25, oppositely disposed flat horizontal bars 43 and 44 (Fig. 3) are secured, as by welding, to the inner faces of the longitudinal bars 35. Two grooved wheels 45 are rotatably mounted by bolts 46 on each side of the carriage 25, the groove of each wheel being adapted to receive the edge of one of the tracks 43 or 44 in rolling engagement. Each carriage 25 is propelled along the support structure by a continuously driven endless chain 47, which is mounted on the support structure 28 in a conventional manner and has its upper run supported in sliding relation on a flat support bar 48 mounted on the frame member 28 immediately below and parallel to the bar 43. The chain 47 is provided with a plurality of spaced upstanding drive lugs 49, each of which is arranged to engage in driving contact an arm 50 which overlies the chain 47 and which is integrally formed on a bracket 51, fixedly secured to the forward portion of each carriage 25. With this arrangement, the continuously moving chain 47 may simultaneously advance a plurality of carriages 25 one after the other past the aligned cutter assemblies 31.

The spaced tracks 43 and 44, which support the carriages, may be flat throughout their length so that each carriage with an unpeeled pear thereon may be bodily placed on the tracks at one end of the machine, as at the left end (Fig. 2) and removed at the opposite end after the pear has been peeled. If desired, the tracks 43 and 44 may be formed as a closed circuit along which the carriages are continuously moved.

Figure 5:
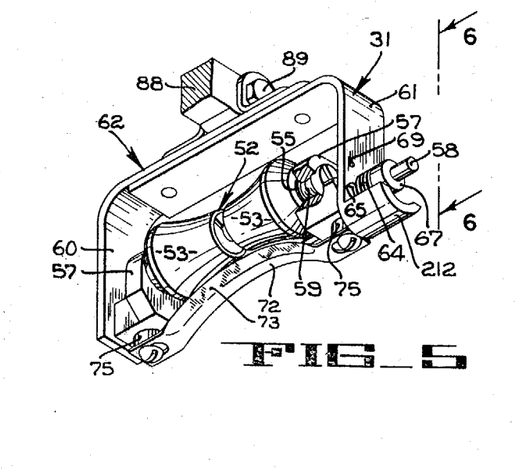
Fig. 5 is an enlarged fragmentary perspective, partly broken away, of the cutter assembly used with the pear machine of the present invention.
Figure 6:
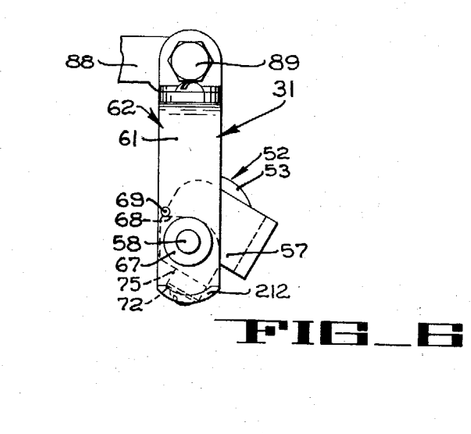
Fig. 6 is a side elevation taken looking in the direction of arrows 6—6 of Fig. 5.

Each cutter assembly 31 comprises a composite concave guide roller 52 (Fig. 5) consisting of two plastic roller elements 53, each of which is rotatably mounted on a metal spindle 55. Each spindle 55 is, in turn, mounted on the outer end of a support arm 57 by means of a setscrew 59 that extends through an opening in the arm and is threaded into the spindle. Each support arm carries a stub shaft 58 which is rotatably journalled in each of two arms 60 and 61 of a yoke 62. The two arms 57 are joined by a bar 56 (Fig. 3) to form a rigid support bracket for the guide roller 52. The composite guide roller 52 is, therefore, freely rotatable about an axis defined by the aligned spindles 55 and is rotatable as a unit with the spaced arms 57 about the axis defined by the aligned stub shafts 58. A torsion spring 64 (Fig. 5) is anchored at one end in a hole 65 in the yoke arm 61 and, at the other end, in a collar 67 adjustably secured to one of the aligned stub shafts 58 by a set screw (not shown). The torsion spring 64 tends to rotate the associated stub shaft 58 in a clockwise direction (Fig. 6), and to thereby pivot the guide roller 52 and the two support arms 57 as a unit toward the position shown in Fig. 6, which is the position the roller assumes before each cutting stroke of the knife and is defined by the abutment of a shoulder 68 formed on an arm 57 with a pin 69 projecting from the yoke arm 61.

A peeling blade 72 (Fig. 5), having a cutting edge 73, extends transversely of the yoke 62 and is secured at each end to bosses 75 formed on the arms 57. The intermediate portion of the blade is arcuate in shape so as to conform to the contour of the concave guide roller 52. The guide roller gauges the depth of the cut taken by the blade 72 and steers or turns the blade to follow closely the irregular contour of the fruit. As the roller traverses the surface of the pear, the knife is pivoted in a counterclockwise direction against the resistance of the torsion spring 64.

Each cutter assembly 31 is held in contact with the surface of the pear by means of a separate pneumatic control mechanism 80 (Fig. 2) that is mounted on the longitudinal upper bar 37 by means of a bracket 81. The pneumatic control mechanism 80 comprises a bellcrank 83 (Fig. 7) that is pivoted at 85 to the lower support bar 38. The yoke 62 of the cutter assembly 31 is secured to the end of one arm 88 of the bellcrank by a bolt 89. The yoke 62 may be adjusted relative to the arm 88 by loosening the bolt 89 and pivoting the yoke about the axis of the bolt. The bellcrank arm 88 has an opening 91 (Fig. 9) formed therein near its outer end. A trigger 90 is pivotally mounted in the opening 91 by a pin 92. A pair of arms 93 (Figs. 10 and 11) project upwardly from the bellcrank arm 88 adjacent the opening 91 to receive a short tube 94 which is adjustably held between the arms by a bolt 95. A similar pair of arms 96 is disposed on the opposite side of the opening 91 to adjustably mount a short tube 97. An upper extension 99 of the trigger 90 is disposed between a large ball 101a of a check valve 101, that is arranged to close the passage 102 in the tube 94, and a smaller ball 103a of a check valve 103, arranged to close the passage 104 in the tube 97. A spring 107 is disposed between the arms 93 and the trigger extension 99 to normally pivot the trigger in a clockwise direction (Fig. 10) to move the small ball 103a to passage-closing position.

The passage 102 in the tube 94 is connected in flow communication, by means of a flexible hose 110, with a passage 111 (Fig. 9) in a tube 112 that is pressed in an opening 113 in one section 114 of a split air-tight control housing 115. Similarly, the passage 104 in the tube 97 communicates through a rigid tubular extension 116 and a flexible hose 117 with a passage 118 in a tube 119 pressed in an opening 120 in the other section 121 of the split housing 115.

The housing 115 has a hollow interior which is divided into two chambers 125 and 126 by a flexible diaphragm 127 that is secured between the two sections of the housing. The housing section 121 has a tubular extension 130 adapted to slidably journal a rod 131 that is secured at one end to the central portion of the diaphragm 127 and is pivotally connected at the other end to an arm 133 of the bellcrank 83. Air under pressure is directed into the chambers 125 and 126 by means of tubes 135 and 136, respectively, that are pressed into openings in the housing and are connected exteriorly of the housing to flexible conduits 138 leading to a source of air under pressure.

The trigger 90 has a feeler arm 140 (Fig. 9) which has a rounded, pear-contacting end portion 141 disposed between the two roller elements 53 of the guide roller 52 of the cutter assembly. Since the cutter assembly is adjustably mounted on the end of the bellcrank arm 88 by the bolt 89, the distance between the feeler arm end 141 and the roller 52 may be adjusted.

Figures 6, 7:
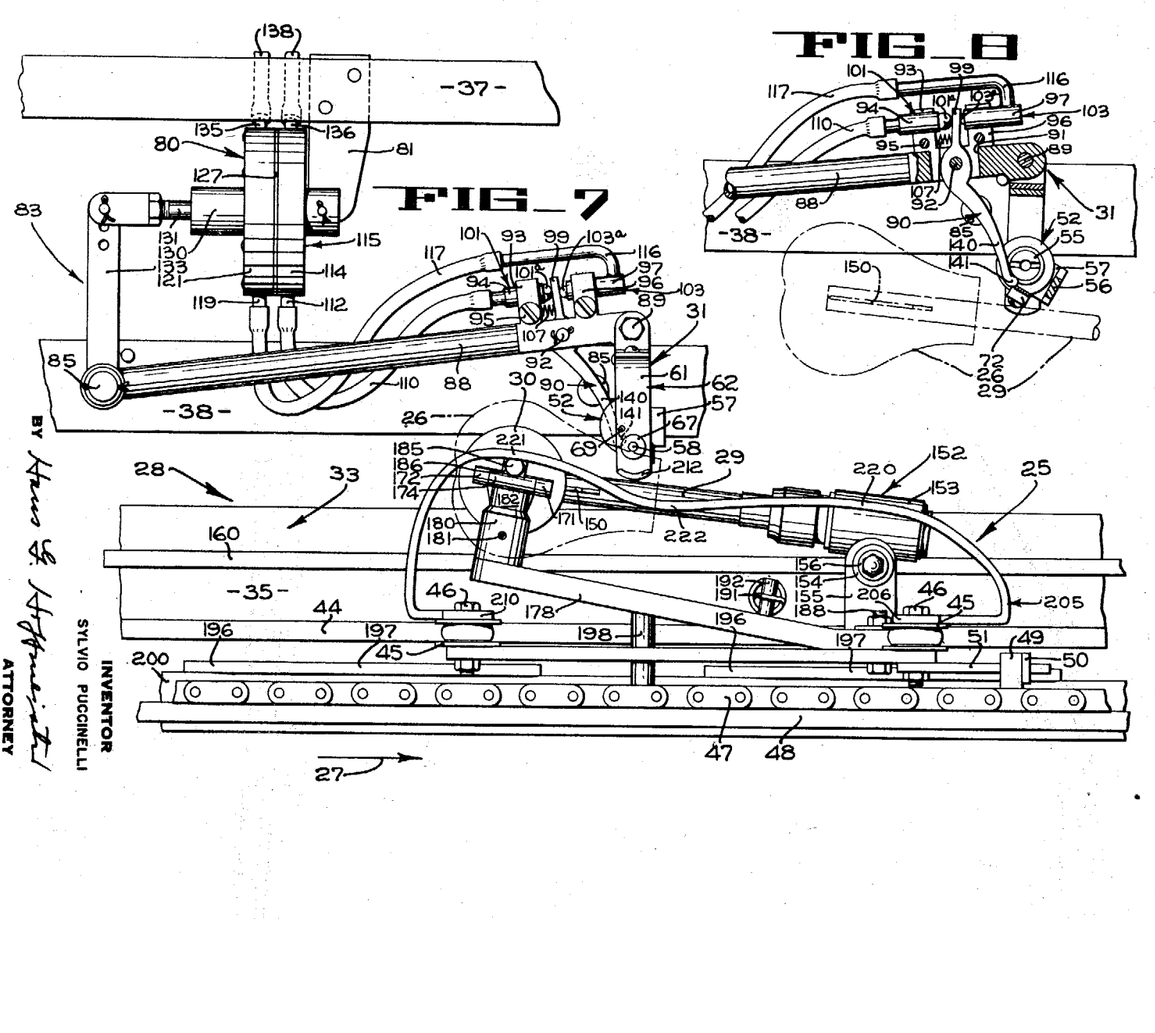
Fig. 7 is an enlarged vertical section taken along lines 7—7 of Fig. 1.
Figures 9, 10, 11:
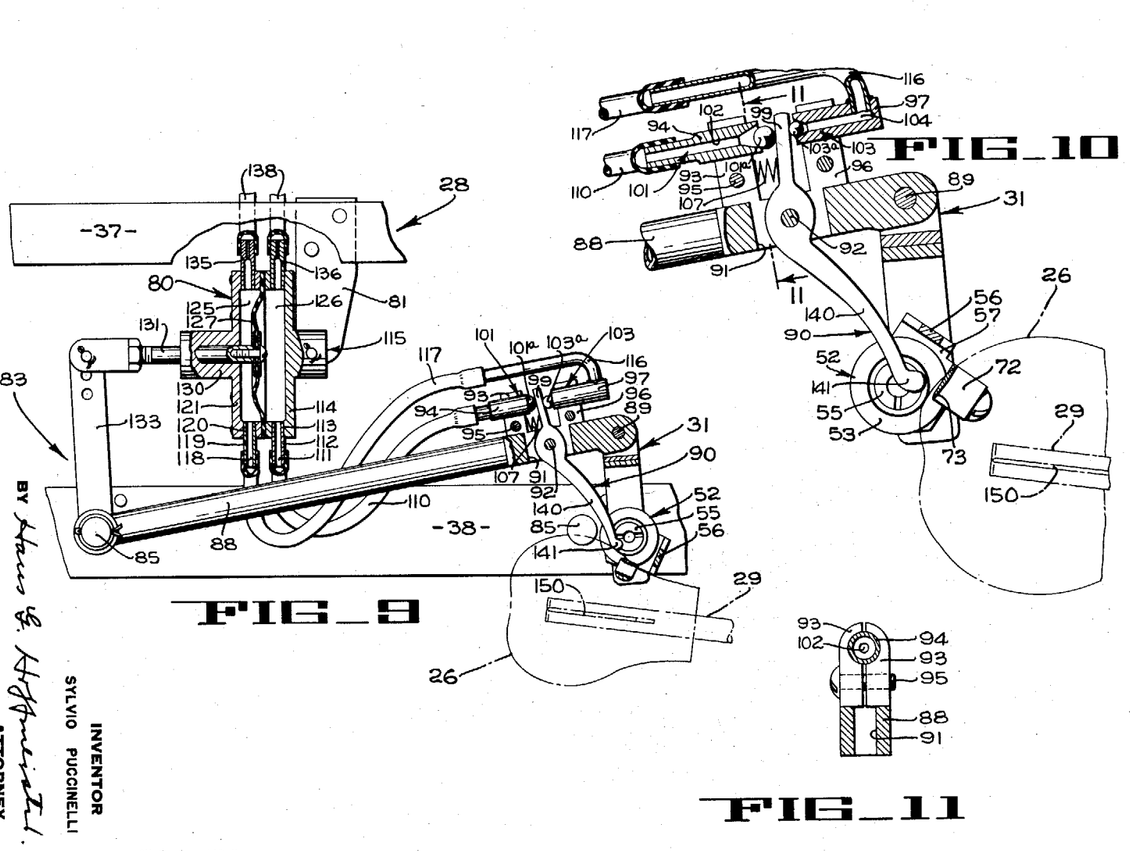

The cutter assembly 31 and the trigger 90 are disposed in the position shown in Fig. 8 as the pear approaches. It will be noted that, since the large ball check 101a is off its seat, the conduit 110 leading to the chamber 126 of the control housing is vented to atmosphere at this time. When the end 141 of the trigger contacts the surface of the pear, the trigger is pivoted in a counterclockwise direction against the resistance of the spring 107 to move the large ball check 101a onto its seat and permit the smaller ball check 103a to move off its seat. With the large ball check closing the conduit 110, pressure builds up in the chamber 126 causing the diaphragm to be moved toward the left to the position shown in Fig. 9. Movement of the diaphragm causes the bellcrank 83 to be pivoted in a counterclockwise direction, raising the cutter assembly a predetermined distance to position the guide roller and the cutting blade in an advantageous position to contact the stem end of the pear and begin the peeling stroke. As the trigger end portion 141 moves along the surface of the pear, the trigger 90 automatically pivots back and forth to maintain the depth of cut substantially constant. Thus, it will be noted in Fig. 9 that if the cutting blade tends to dig deeper into the pear, the trigger will be pivoted counterclockwise, venting the chamber 125 and causing counterclockwise swinging of the bellcrank 83 to lift the cutter outwardly of the pear. Similarly, if the cutter tends to leave the surface of the pear, the spring 107 swings the trigger clockwise, venting chamber 126 and causing the bellcrank and cutter to be swung toward the pear. In Fig. 7 the relative position of the trigger end portion 141 and the cutter assembly is shown, as the cutting blade moves along the stem end of the pear. In Fig. 9 the cutting blade is moving up the butt end of the pear. As the cutter starts down the butt end of the pear, the trigger end portion 141 drops away from the surface of the pear, as shown in Fig. 10, permitting the spring 107 to pivot the trigger clockwise to move the small ball check 103a to closed position and allow the large ball check valve 101 to move to open position. With this setting of the ball check valves, the chamber 126 is vented and pressure is built up in chamber 125 to shift the diaphragm 127 toward the right (Fig. 9) and swing the bellcrank 83 in a clockwise direction. As a result, the cutter assembly 31 is swung downwardly, maintaining the blade in contact with the pear and allowing the blade to complete the peeling of the butt end during a relatively short longitudinal movement of the pear past the cutter.

Figure 4:
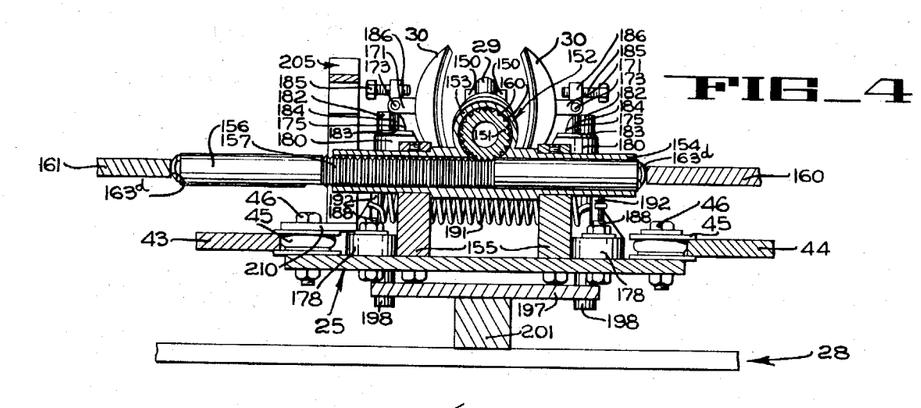
Fig. 4 is a fragmentary vertical section taken along lines 4—4 of Fig. 3.

As previously mentioned, during the peeling operation, the pear is impaled on a support tube 29 which is provided with fins 150 (Fig. 12) on one end and is secured at the other end to a pinion 151 of an indexing mechanism 152 (Fig. 4). The pinion 151 is rotatably journalled in a cylindrical housing 153 integrally formed transversely on a sleeve 154. The sleeve 154 is rotatably journalled in spaced bearing blocks 155 which are rigidly secured to the upper surface of the carriage 25. Journalled within the sleeve 154 and arranged to slide axially therein is a rod 156, having a circular rack 157 formed thereon, the teeth of the rack being arranged to mesh with concave teeth 160 of the pinion 151. It will be evident that, as the rod 156 is shifted from left to right, or vice versa, the pinion 151 and the attached support tube 29 will be angularly indexed, about the axis of the pinion, a number of degrees proportional to the amount of lateral shifting of the rod 156. The lateral disposition of the rod 156 is controlled by two longitudinally extending, horizontally disposed cam plates 160 and 161 (Fig. 1) which have camming edges against which the opposite ends of the rod 156 abut. Each cam plate has a plurality of straight camming edge portions 163, 163a, 163b, 163c and 163d connected by slanted transition portions 164. The edge portions 163, 163a, 163b, 163c and 163d on one cam plate are of the same longitudinal extent and are directly opposite corresponding edge portions 163, 163a, 163b, 163c and 163d on the other cam plate and cooperate therewith to determine the lateral position of the rod 156. As seen in Fig. 1, at the left-hand end of the machine, the edges 163, 163 hold the rod 156 in a limiting position at one side of the machine. As the carriage 25 travels toward the right, the rod 156 will be shifted step by step transversely of the frame until the camming edges 163d, 163d are reached. At this point, the rod 156 has reached the limiting position at the opposite side of the machine and the intermittent angular indexing movements of the support tube and the pear thereon will be completed. It will be understood that the number of angular indexing movements of the support tube are so coordinated with the width of each strip of peel severed by the cutting blade that the entire surface of the pear will be peeled while the pear is rotated one complete revolution.

Figure 12:
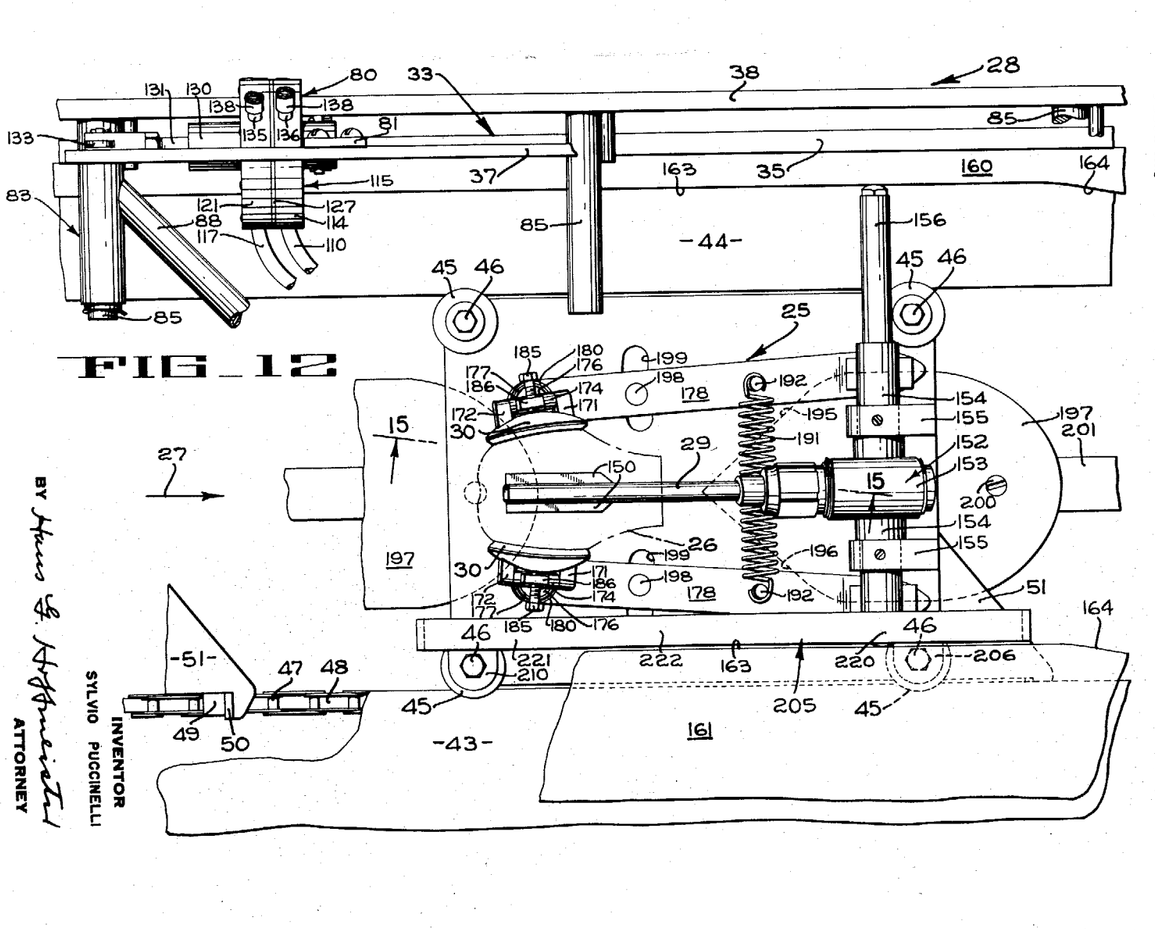
Fig. 12 is an enlarged fragmentary plan, with parts broken away, taken looking along lines 12—12 of Fig. 2.
Figures 13, 14, 15:
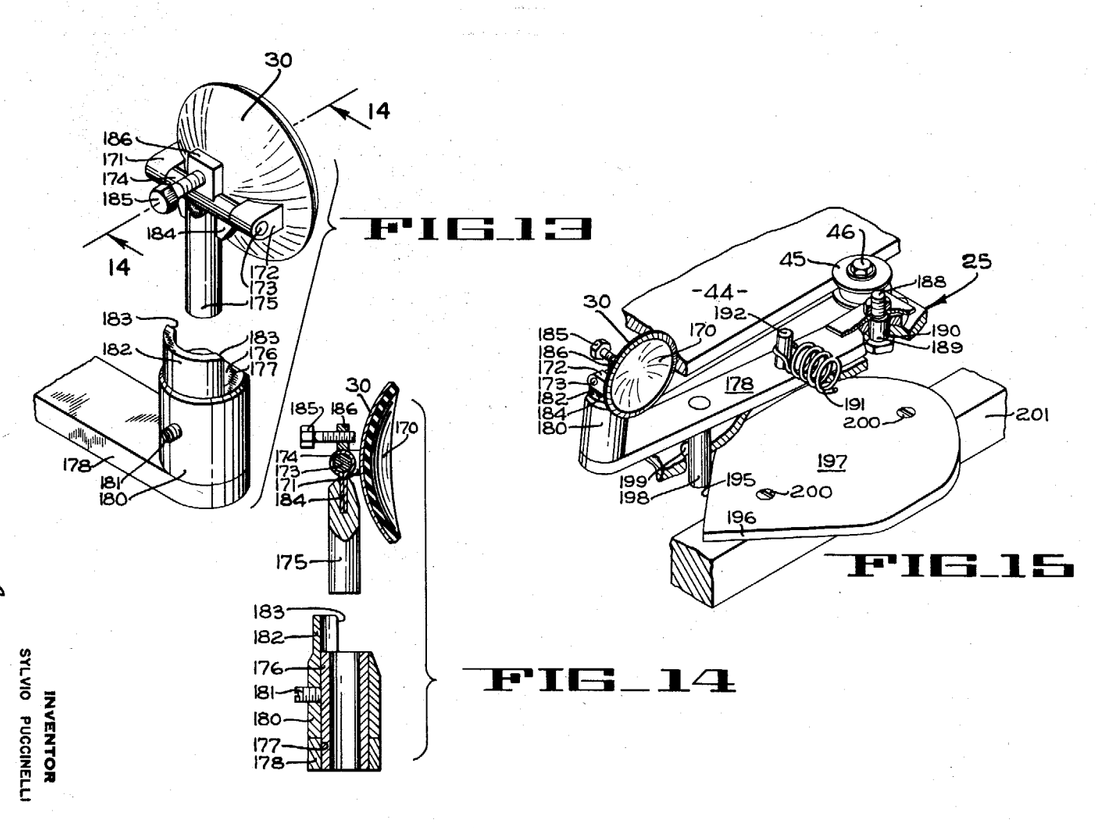
Fig. 13 is an enlarged exploded perspective of one of the pear clamping arms used in the machine of Fig. 1.
Fig. 14 is an exploded section of Fig. 13 looking in the direction of arrows 14—14.
Fig. 15 is a fragmentary perspective of the pear clamping mechanism, partly broken away and looking in the direction of arrows 15—15 of Fig. 12.

When a strip of peel is being cut from the pear, the pear is supported jointly by the support tube 29 and by the opposed clamping cups 30 (Figs. 12 and 15). Each clamping cup 30 comprises a concave pear-contacting member 170 (Figs. 14 and 15) that has two spaced, rearwardly extending arms 171 and 172 which receive the reduced diameter ends of a rod 173 in pivotal engagement. The central portion of the rod 173 is journalled in a sleeve 174 that is secured transversely on the upper end of a shaft 175 which is arranged to be rotatably supported in a sleeve 176 (Fig. 14). The sleeve 176 is rotatably journalled in an opening 177 in a cup-supporting arm or lever 178. An outer sleeve 180 is disposed around the sleeve 176 and is keyed thereto by a setscrew 181 (Figs. 13 and 14). At its upper end, the outer sleeve 180 has a wing-like member 182 which has spaced abutment surfaces 183 that are positioned to be contacted by wings 184 depending from the sleeve 174. An adjustable stop screw 185 is threaded through an arm 186 projecting upwardly from the sleeve 174. The inner end of the screw limits the pivoting movement of the cup 30. With the above-described arrangement each concave cup can swing about the axis of the shaft 175 and about the axis of the rod 173.

Each cup control lever 178 is pivotally mounted on the carriage 25 by a bolt 188 (Fig. 15) which has a smooth shank portion 189 extending through an opening 190 in the carriage. A spring 191 (Fig. 12) is connected between upstanding pins 192 on the levers 178 and normally swings the levers toward each other into pear-supporting contact with a pear on the support tube 29. When the pear is to be indexed angularly preparatory to a strip being peeled therefrom, it is desirable to support the pear only from the support tube 29 since the frictional engagement of the cups 30 will resist the indexing movement. Accordingly, after one strip has been removed from the pear and just before the rod 156 (Fig. 12) reaches a slanted cam transition portion 164, the levers 178 are swung outwardly by the contact of slanted camming edges 195 and 196 of a fixed cam plate 197 with pins 198 which are secured to the levers 178 and project downwardly therefrom through slots 199 in the carriage 25 and into the path of movement of the camming edges. The cam plate 197 is secured by capscrews 200 to a fixed longitudinal frame member 201.

To prevent the cutter assembly from colliding with the support tube 29 when there is no pear impaled on the tube, a guide track 205 (Fig. 3) is mounted longitudinally on the carriage 25 along one side thereof. At its forward end, the track 205 has a laterally projecting apertured tab 206 secured to the carriage 25 by the bolt 46 that mounts one of the wheels 45. At its rear end, a bolt 46 secures a laterally projecting apertured tab 210 of the track 205 to the carriage. The track is arranged to be contacted by a follower shoe 212 which projects outwardly from the yoke of the cutter assembly 31. It will be noted in Fig. 7 that the track is provided with a portion 220 which lifts the cutter assembly clear of the support tube housing and portions 221 and 222 which will lift the cutter clear of the support tube if no pear is impaled thereon.

The pear peeling machine of the present invention is put into operation by starting the power unit (not shown) that drives the endless chain 47 (Fig. 3). Each upstanding lug 49 on the chain will drivingly engage the arm 50 of the carriage bracket 51 to propel the carriage 25 forwardly in the direction of arrow 27 along the support structure 28. The operator is stationed at a loading point which may be located at the left-hand end of the machine of Figs. 1 and 2. As each carriage 25 passes, the operator impales a pear axially on the support tube 29 at a time when the cups 30 (Fig. 12) are held outwardly of their fruit-gripping position by the cam plate 197. The impaled pear is then carried on the carriage 25 toward the right under the consecutive cutters 31.

As the pear passes under each cutter, a longitudinal strip of peel is cut from the pear by the self-adjusting cutter head 31. The pneumatic control mechanism maintains a desired downward pressure on the head 31 so that the depth of cut of the cutting blade is maintained substantially constant. As the cutting blade passes over the butt end of the pear, the pneumatic control mechanism automatically causes a rapid downward movement of the blade so that the butt end is traversed by the blade during a relatively short amount of forward movement of the carriage 25.

During the interval in which the pear travels between two cutters, the cups 30 are spread apart to permit the pear support tube 29 to be angularly indexed by the indexing mechanism 152 which is actuated by the camming surfaces of the cam plates 160 and 161. When the pear is completely peeled, it is withdrawn from the support tube 29 manually or by a suitable stripping mechanism.

From the foregoing description it will be seen that the present invention provides a particularly effective mechanism for peeling a pear while it is moved along a straight line path. The use of an automatically adjusting pneumatic control for the cutter head assures a uniform peel throughout the entire length of the pear and provides a means for effectively cutting a peel from the butt end of the pear.

It is to be particularly noted that the cups, which engage the sides of the pear, provide an effective means of supporting the pear while the peel is being removed from the upper surface by the pneumatically controlled cutter.

It will be understood that modifications and variations of the embodiment of the invention disclosed herein may be resorted to without departing from the scope of the novel concepts of the invention.

Having thus described my invention, what I claim as new and desire to protect by Letters Patent is:

1. A machine for peeling pears or the like comprising a plurality of successively aligned cutters, conveyor means for transporting a pear along a predetermined path adjacent said cutters, a pear support member mounted on said conveyor means and arranged to support a pear with the stem-blossom axis of the pear disposed substantially parallel to said path, a support structure adjacent said conveyor means, means pivotally mounting each of said cutters on said support structure for movement toward and away from said pear support member, and a control mechanism operatively connected to each cutter and arranged to apply a pressure on said cutter urging said cutter toward the pear on said support tube, said control mechanism including feeler means in engagement with the surface of the pear and arranged to selectively increase or decrease said pressure in response to the contour of the pear, pressure applying means operatively connected to said cutter mounting means and having a plurality of settings for applying different amounts of pressure to said mounting means, and means connecting said feeler means directly to said pressure applying means independently of said cutter mounting means whereby movement of said feeler means in response to the contour of a pear effects a change in the setting of said pressure applying means and changes in the position of said cutter mounting means are made only by said pressure applying means.

2. A machine for peeling pears or the like comprising a plurality of aligned cutters, conveyor means for transporting a pear along a predetermined path adjacent said cutters, a pear support member mounted on said conveyor means and arranged to support a pear with the stem-blossom axis of the pear disposed substantially parallel to said path, a support structure adjacent said conveyor means, means pivotally mounting each of said cutters on said support structure for movement toward and away from said pear support member, a pressure-actuated control mechanism connected to the mounting means of each cutter, each mechanism including a first pressure chamber arranged upon being energized to pivot said mounting means toward the associated pear support member and a second pressure chamber arranged upon being energized to pivot said mounting means away from said pear support member, and means responsive to the contour of a pear on said support member and arranged to selectively energize one of said chambers while de-energizing the other of said chambers.

3. A machine for peeling pears or the like comprising a plurality of aligned cutters, conveyor means for transporting a pear along a predetermined path adjacent said cutters, a pear support member mounted on said conveyor means and arranged to support a pear with the stem-blossom axis of the pear disposed substantially parallel to said path, a support structure adjacent said conveyor means, means pivotally mounting each of said cutters on said support structure for movement toward and away from said pear support member, a pneumatically-actuated control mechanism connected to the mounting means of each cutter, each control mechanism comprising a pair of pressure chambers, a movable diaphragm disposed between said chambers, a linkage connecting said diaphragm to said mounting means whereby movement of said diaphragm in one direction causes pivoting of the cutter toward said pear support member and movement of the diaphragm in an opposite direction causes pivoting of the cutter away from the pear support member, means for conducting air at the same pressure to both chambers, a vent passage for each of said chambers, valve means arranged to selectively open either of said vent passages and including a feeler arranged to ride over the surface of a pear on said support member and open said vent passages in response to the contour of the pear.

4. A machine for peeling pears or the like comprising a plurality of aligned cutters, conveyor means for transporting a pear along a predetermined path adjacent said cutters, a pear support member mounted on said conveyor means and arranged to support a pear with the stem-blossom axis of the pear disposed substantially parallel to said path, a support structure adjacent said conveyor means, means pivotally mounting each of said cutters on said support structure for movement toward and away from said pear support member, a pneumatically-actuated control mechanism connected to the mounting means of each cutter, each control mechanism including a pair of pressure chambers, a movable diaphragm disposed between said chambers, a linkage connecting said diaphragm to said mounting means, whereby movement of said diaphragm in one direction causes pivoting of the cutter toward said pear support member and movement of the diaphragm in an opposite direction causes pivoting of the cutter away from the pear support member, means for conducting air at the same pressure to both chambers, a vent passage for each of said chambers, and means responsive to the contour of a pear on said pear support member for selectively opening the vent passage of one chamber and closing the vent passage of the other.

5. A machine for peeling pears or the like comprising a plurality of successively aligned cutters, conveyor means for transporting a pear along a predetermined path adjacent said cutters, a pear support member mounted on said conveyor means and arranged to support a pear with the stem-blossom axis of the pear disposed substantially parallel to said path, a support structure adjacent said conveyor means, a bell crank pivotally mounted on said support structure and having one arm disposed above said pear support member, a cutter mounted on said one arm of said bell crank, means defining an opening adjacent the end of said one arm of said bell crank, a pneumatically-actuated cylinder mounted adjacent said bell crank, a diaphragm dividing the inside of said cylinder into two chambers, a link connecting said diaphragm to the second arm of said bell crank whereby movement of said diaphragm in one direction causes movement of said cutter toward said pear support member and movement of said diaphragm in the opposite direction causes movement of said cutter away from said pear support member, means for conducting pressurized air at the same pressure to both of said chambers, a vent passage for each of said chambers, and valve means operatively associated with both of said vent passages for opening one passage while closing the other and including a feeler member pivotally mounted in the opening in said one arm of said bell crank, said feeler member having a portion movable along the surface of a pear on said support member and arranged to open and close said vent passages in response to the contour of the pear.

6. In combination, a support structure, conveying means for moving a pear to be peeled along a predetermined path adjacent said structure, a cutter support arm pivotally mounted on said structure, fluid actuated control means mounted on said structure and operatively connected to said cutter support arm, said control means having a plurality of settings each of which is arranged to adapt said control means to apply a different pressure to said cutter support arm, feeler means arranged to engage the surface of the pear as it is advanced by said conveying means and to be pivoted in response to the contour of the pear, and means operatively connecting said feeler means to said control means so that pivotal movement of said feeler means effects a change in the setting of said control means.

References Cited in the file of this patent

UNITED STATES PATENTS

| Number | Name | Date |
|---|---|---|
| 943,249 | Jahansan | Dec. 14, 1909 |
| 1,785,011 | Felizianetti | Dec. 16, 1930 |
| 1,973,996 | Reinstein | Sept. 18, 1934 |
| 1,982,709 | Thompson | Dec. 4, 1934 |
| 2,459,368 | Dunn | Jan. 18, 1949 |
| 2,565,727 | Henderson | Aug. 28, 1951 |
| 2,664,127 | Perrelli | Dec. 29, 1953 |
| 2,699,191 | De Back et al. | Jan. 11, 1955 |
| 2,742,067 | Coons et al. | Apr. 17, 1956 |
| 2,775,279 | Perrelli | Dec. 25, 1956 |
| 2,789,603 | De Back et al. | Apr. 23, 1957 |